US010351282B2

(12) United States Patent
Tarumoto et al.

(10) Patent No.: US 10,351,282 B2
(45) Date of Patent: Jul. 16, 2019

(54) CONTROL VALVES FOR SEALING DEVICE

(71) Applicant: FUJI IMPULSE CO., LTD., Osaka (JP)

(72) Inventors: Kazuyoshi Tarumoto, Osaka (JP); Yuichiro Kataoka, Osaka (JP)

(73) Assignee: FUJI IMPULSE CO. (JP)

( * ) Notice: Subject to any disclaimer, the term of this patent is extended or adjusted under 35 U.S.C. 154(b) by 0 days.

(21) Appl. No.: 15/750,470

(22) PCT Filed: Sep. 15, 2017

(86) PCT No.: PCT/JP2017/033492
§ 371 (c)(1),
(2) Date: Feb. 5, 2018

(87) PCT Pub. No.: WO2018/066345
PCT Pub. Date: Apr. 12, 2018

(65) Prior Publication Data
US 2019/0016490 A1    Jan. 17, 2019

(51) Int. Cl.
*B65B 51/10* (2006.01)
*F16K 31/16* (2006.01)
(Continued)

(52) U.S. Cl.
CPC .............. *B65B 51/10* (2013.01); *B29C 65/00* (2013.01); *F16H 19/04* (2013.01); *F16K 31/16* (2013.01);
(Continued)

(58) Field of Classification Search
CPC ......... B29C 65/02; B29C 65/24; B29C 65/38; F16K 31/54; F16K 31/12;
(Continued)

(56) References Cited

U.S. PATENT DOCUMENTS 4,082,115 A * 4/1978 Gibb ...................... F01D 17/18
137/630.2
4,700,735 A    10/1987 Hamernik et al.
(Continued)

FOREIGN PATENT DOCUMENTS

CN          104494916 A     4/2015
JP          5632171         11/2014
(Continued)

OTHER PUBLICATIONS

International Search Report from PCT/JP2017/033492 dated Nov. 21, 2017 (9 pages).
(Continued)

*Primary Examiner* — Marina A Tietjen
*Assistant Examiner* — Daphne M Barry
(74) *Attorney, Agent, or Firm* — Calfee, Halter & Griswold LLP

(57) ABSTRACT

A valve device includes a control device adapted to control a valve without being supplied with electricity. The control device includes at least one rotatable control cam having an outer periphery with a concave and convex shape, and a driving device adapted to rotate the control cam only in a first rotational direction, out of the first rotational direction and a second rotational direction opposite from the first rotational direction, by being supplied with a pressurized medium. The valve is placed such that a switch portion comes in contact with the outer peripheral portion of the control cam, in order that the valve is opened and closed by the control cam being rotated.

15 Claims, 10 Drawing Sheets

(51) Int. Cl.
*F16H 19/04* (2006.01)
*F16K 31/524* (2006.01)
*B29C 65/00* (2006.01)
*F16H 25/00* (2006.01)

(52) U.S. Cl.
CPC ............ *F16K 31/524* (2013.01); *F16H 25/00* (2013.01); *F16K 31/52408* (2013.01)

(58) Field of Classification Search
CPC ......... F16K 31/52408; F16K 31/52483; F16K 31/52475; F16K 31/524; F16K 31/523; F16K 31/52
See application file for complete search history.

(56) References Cited

U.S. PATENT DOCUMENTS

| 5,653,419 | A | 8/1997 | Uchisawa et al. |
| 6,994,319 | B2 | 2/2006 | Yudovsky |
| 2006/0076112 | A1* | 4/2006 | Matzenmuller ... B29C 66/81611 156/580 |
| 2016/0031153 | A1 | 2/2016 | Yamada et al. |

FOREIGN PATENT DOCUMENTS

| JP | 2015083502 A | 4/2015 |
| JP | 6148392 | 6/2017 |
| WO | 1994021951 | 9/1994 |

OTHER PUBLICATIONS

Decision to Grant a Patent for Japanese Patent Application No. 2016-197327 (6 pages, including translation).
Office Action from Patent Application No. 2016-197327 (7 pages, including translation).
Office Action from Chinese Application No. 201780002699.7 dated Oct. 22, 2018.
International Preliminary Report on Patentability for International Application No. PCT/JP2017/033492 dated Apr. 19, 2019.

* cited by examiner

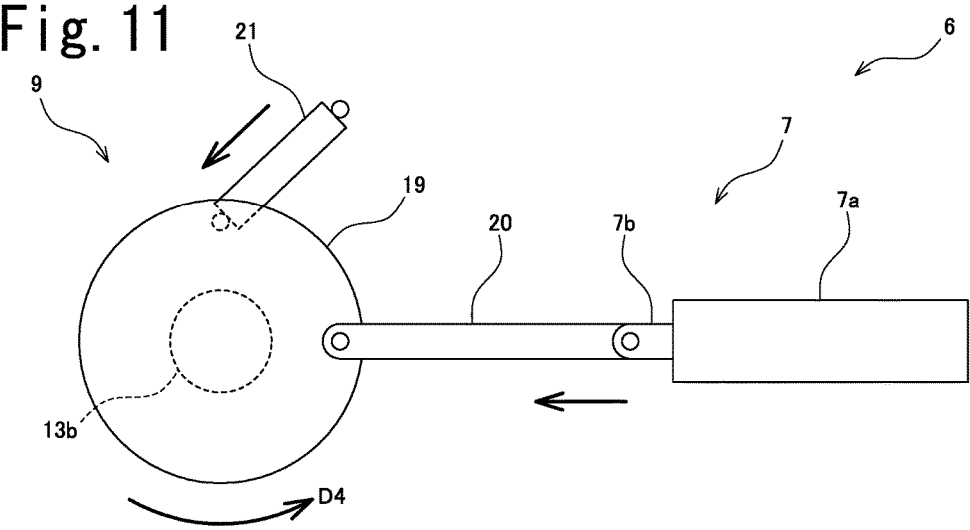
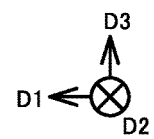
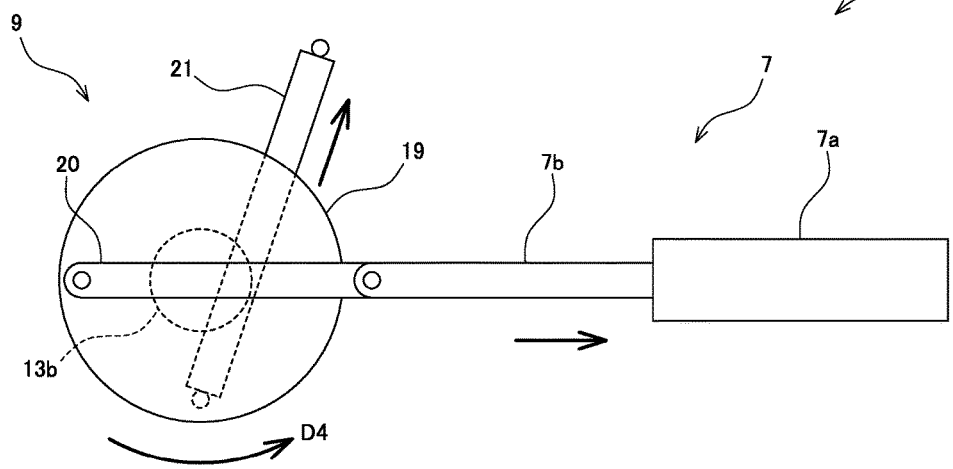
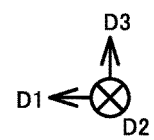

CONTROL VALVES FOR SEALING DEVICE

CROSS REFERENCE TO RELATED APPLICATION

This application is a 371 of International Application No. PCT/JP2017/033492, filed on Sep. 15, 2017, which is based upon and claims a priority to Japanese Patent Application No. 2016197327, filed on Oct. 10, 2016, the entire contents of which are incorporated herein by reference.

TECHNICAL FIELD

The present invention relates to valve devices including at least one valve which is openable and closable and, further, relates to sealing devices including such valve devices.

BACKGROUND ART

Conventionally, as sealing devices, there have been known sealing devices including valves which are openable and closable, and control devices for controlling these valves (for example, Patent Document 1). On the other hand, in such sealing devices, the valves are electromagnetic valves, and the control devices are electric sequencers such as CPUs. Accordingly, the sealing devices are supplied with electricity, in order to control the valves.

CITATION LIST

Patent Literature

Patent Document 1: JP-A-2015-83502

SUMMARY OF THE INVENTION

Technical Problem

Therefore, it is an object to provide a valve device and a sealing device which are capable of controlling valves, without being supplied with electricity.

Solution to Problem

There is provided a valve device, which includes:
at least one valve having a switch portion and adapted to be opened and closed by the switch portion being operated; and
a control device adapted to control the valve without being supplied with electricity;
the control device includes at least one rotatable control cam having an outer periphery with a concave and convex shape, and a driving device adapted to rotate the control cam only in a first rotational direction, out of the first rotational direction and a second rotational direction opposite from the first rotational direction, by being supplied with a pressurized medium, and
the valve is placed such that the switch portion comes in contact with the outer peripheral portion of the control cam, in order that the valve is opened and closed by the control cam being rotated.

Further, the valve device may have a configuration in which:
the control cam is placed such that the control cam comes into contact with the switch portion and separates from the switch portion, by being rotated.

Further, the valve device may have a configuration in which:
a plurality of the valves and a plurality of the control cams are provided, and
the driving device includes a rolling member secured to the plurality of the control cams, such that the rolling member rotates integrally with the plurality of the control cams about the same axis.

Further, the valve device may have a configuration in which:
the driving device includes a movable member adapted to perform reciprocating motion by being supplied with the pressurized medium, and
a conversion transmission portion adapted to convert the reciprocating motion of the movable member into rotational motion and to transmit the rotational motion to the control cam.

Further, the valve device may have a configuration in which:
the conversion transmission portion includes a rack secured to the movable member, a pinion adapted to rotate by engaging with the rack, and a clutch adapted to transmit, to the control cam, only a rotational torque in the first rotational torque, out of rotational torques of the pinion.

Further, the valve device may have a configuration in which:
the pinion is adapted to rotate in the first rotational direction when the movable member performs forward motion, and
the driving device includes a drag member adapted to apply a drag force to the movable member, when the movable member performs the forward motion.

Further, the valve device may have a configuration in which:
the drag force applied to the movable member by the drag member is larger than the rotational torque transmitted to the control cam through the clutch.

Further, the valve device may have a configuration in which:
the driving device includes a positional adjustment portion adapted to position the control cam at an original position when the movable member has completed a single reciprocating motion, and
the positional adjustment portion includes a rotary member adapted to rotate integrally with the control cam, and a lock member adapted to lock the rotary member when the control cam is positioned at the original position.

Further, the valve device may have a configuration in which:
the lock member slides on an outer peripheral portion of the rotary member,
the positional adjustment portion includes a pressurizing member adapted to bring the lock member into press contact with the rotary member,
the rotary member includes a lock portion with a concave shape which is locked by the lock member, when the control cam is positioned at the original position,
an amount of rotation of the pinion in the first rotational direction which is caused by a single forward motion of the movable member is equal to or less than a single rotation,
the rotary member includes a guide portion adapted to guide the lock member up to the lock portion from a position at which the lock member is positioned as a result of a single forward motion of the movable member, and the guide portion is gradually deepened toward the lock portion, in order that the rotary member rotates in the first rotational direction by being in press contact with the lock member.

Further, there is provided a sealing device, which includes:

a pair of sealing portions adapted to get closer to each other and to get away from each other for sandwiching an object for sealing the object; and the valve device;

wherein the valve device is adapted to control an operation of at least one of the pair of the sealing portions.

Advantageous Effect of the Invention

As described above, the valve device and the sealing device have an excellent advantage of being capable of controlling the valves, without being supplied with electricity.

BRIEF DESCRIPTION OF THE DRAWINGS

FIG. 11 is a view of the general outline of main portions of a driving device according to yet another embodiment.

FIG. 12 is a view of the general outline of main portions of the driving device according to the same embodiment.

DESCRIPTION OF EMBODIMENTS

Figure 1:
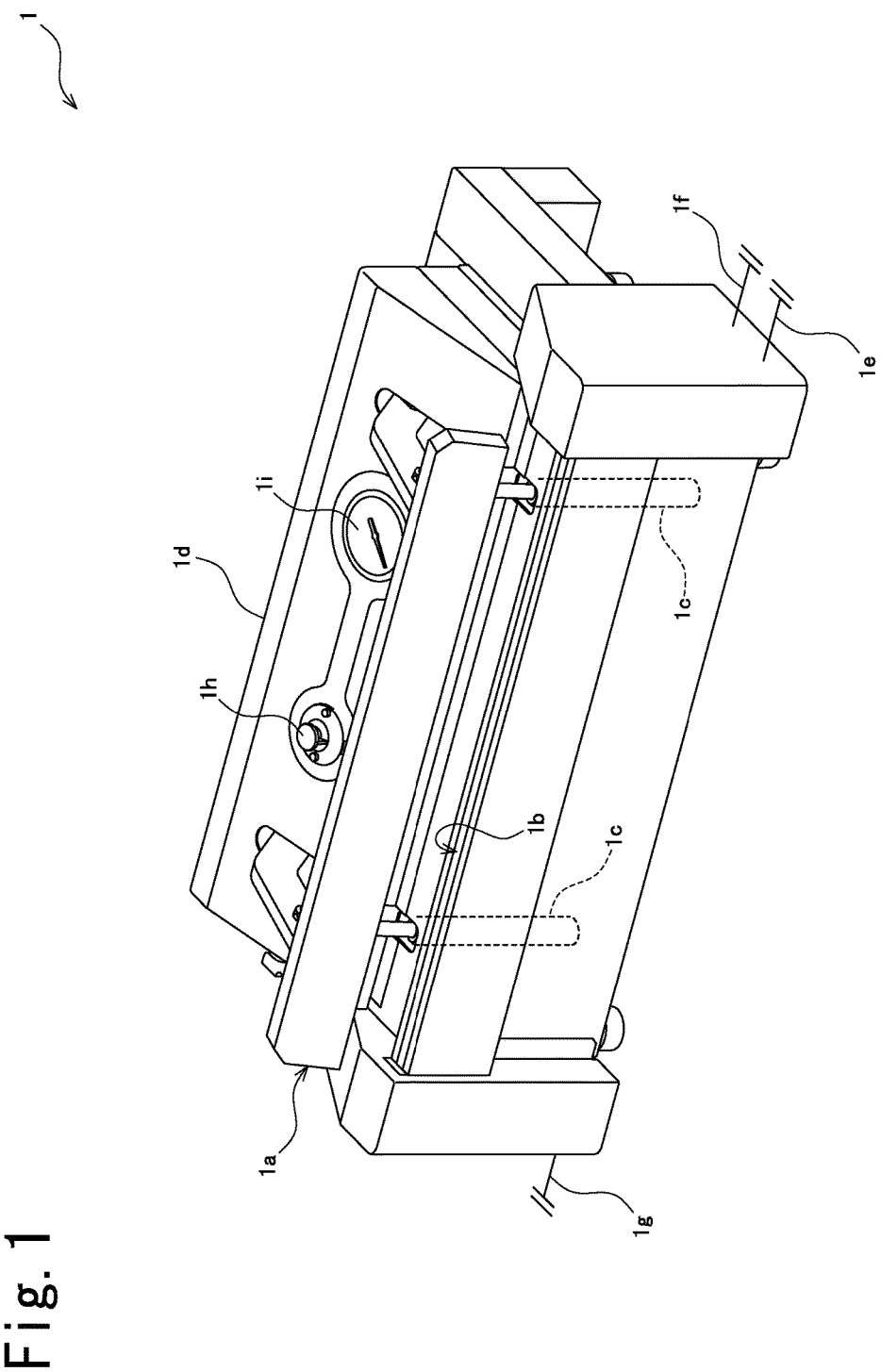
FIG. 1 is a perspective view of entirety of a sealing device according to an embodiment.

Hereinafter, an embodiment of a valve device and a sealing device will be described, with reference to FIGS. 1 to 8. Further, throughout the respective drawings (similarly to FIGS. 9 to 14), the dimension ratios in the drawings are not necessarily coincident with the actual dimension ratios, and the dimension ratios among the respective drawings are not necessarily coincident with each other.

As illustrated in FIG. 1, a sealing device 1 according to the present embodiment includes a pair of sealing portions 1a and 1b adapted to sandwich an object therebetween for sealing the object, an operating portion 1c adapted to operate the first sealing portion 1a, and a casing 1d for housing respective structures therein. Further, although not illustrated in FIG. 1, the sealing device 1 includes a valve device 2 adapted to control operations and the like of the first sealing portion 1a, within the casing 1d.

Further, the sealing device 1 includes a steam supply portion 1e for supplying steam (heated medium) to the inside of the second sealing portion 1b, an air supply portion 1f for supplying a compressed air (cooled medium, pressurized medium) to the respective structures (for example, the valve device 2) and the inside of the second sealing portion 1b, and an exhaust portion 1g for exhausting the respective mediums from the inside of the second sealing portion 1b. Further, the sealing device 1 includes a timer 1h for setting a heating time for sealing with the pair of the sealing portions 1a and 1b, and a thermometer 1i adapted to detect and display the temperature of the second sealing portion 1b.

Figure 2:
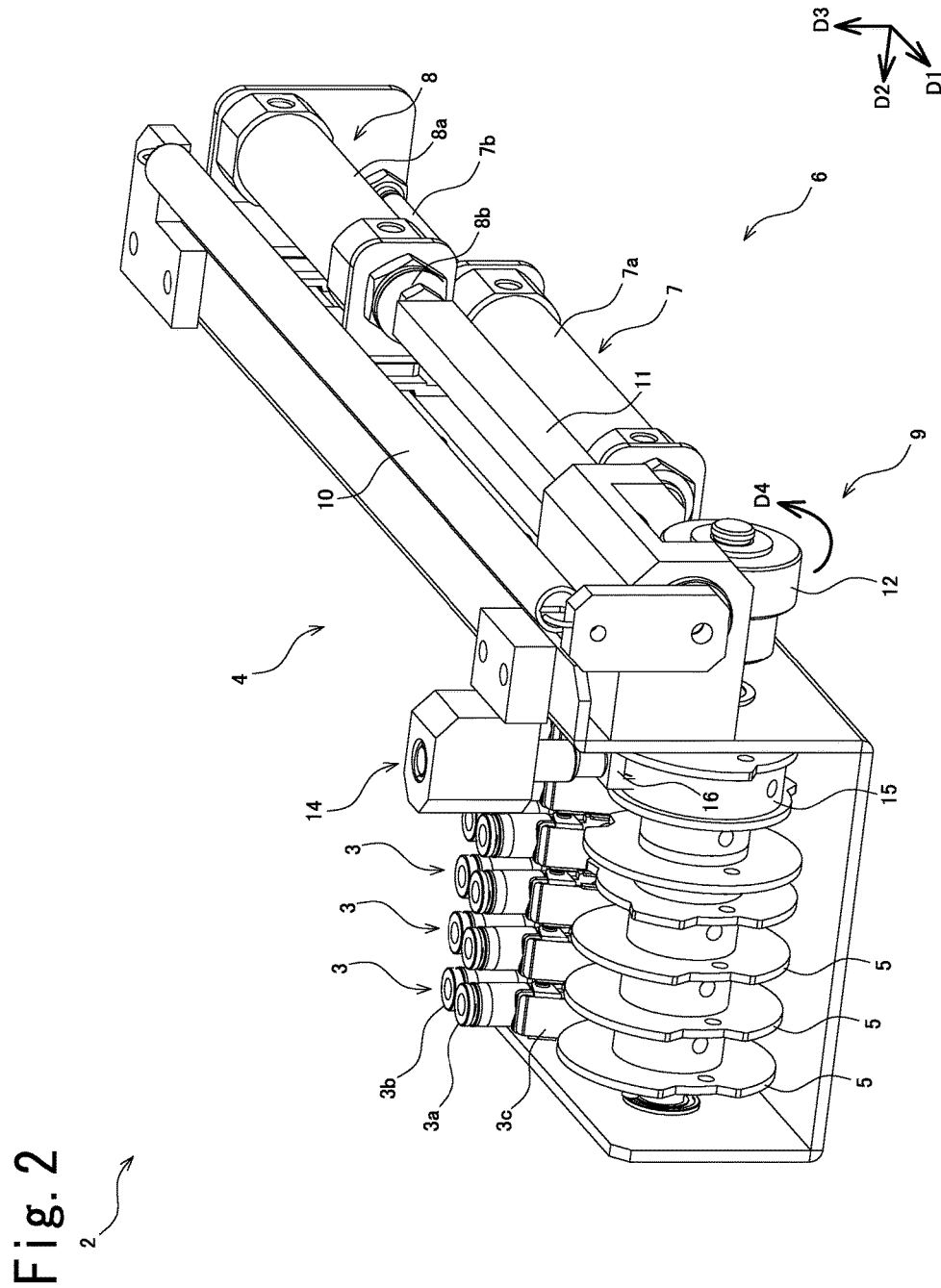
FIG. 2 is a perspective view of entirety of a valve device according to the same embodiment.

As illustrated in FIG. 2, the valve device 2 includes plural valves 3 which are opened and closed, and a control device 4 adapted to control the valves 3 without being supplied with electricity. The control device 4 includes plural rotatable control cams 5 having concave-and-convex shapes on their outer peripheries, and a driving device 6 adapted to rotate the control cams 5 by being supplied with the pressurized medium.

The valves 3 include an inlet portion 3a for introducing a medium (for example, the compressed air) thereinto, and an outlet portion 3b adapted to discharge this medium when being opened. Further, the valves 3 include a switch portion 3c. Further, the valves 3 are opened and closed, when these switch portions 3c are operated. More specifically, the valves 3 are mechanical valves adapted to operate without being supplied with electricity.

Further, the valves 3 are placed, such that the switch portions 3c are in contact with the outer peripheral portions of the control cams 5, so that the valves 3 are opened and closed by the control cams 5 being rotated. Further, the switch portions 3c are not limited to such a structure kept in contact with the outer peripheral portions of the control cams 5 and can be also structured to repeatedly come in contact therewith and separate therefrom. Namely, the switch portions 3c can be also structured to come into contact with the outer peripheral portions of the control cams 5, only when the valves 3 are opened (or closed).

Further, the plural valves 3 include heat-medium valves which are opened and closed, in order to supply the heated medium (the steam) and the cooled medium (the compressed air) to the second sealing portion 1b, for example. Further, the plural valves 3 include pressurized-medium valves which are opened and closed, in order to supply the pressurized medium (the compressed air) to the operating portion 1c, for example.

The driving device 6 includes first and second cylinders 7 and 8 having movable members 7a and 8b which are movable with respect to main bodies 7a and 8a. Further, the driving device 6 includes a conversion transmission portion 9 adapted to convert linear reciprocating motion of the first and second cylinders 7 and 8 into rotational motion and to transmit the rotational motion to the control cams 5. Further, the driving device 6 includes a drag member 10 for applying a drag force to the first and second cylinders 7 and 8.

In the present embodiment, the first and second cylinders 7 and 8 include two air cylinders adapted to use a compressed air as the pressurized medium, but the first and second cylinders 7 and 8 are not limited to this structure. For example, the cylinders can be also constituted by hydraulic cylinders adapted to use oil as the pressurized medium. Also, only one cylinder can be provided, for example.

The conversion transmission portion 9 includes a rack 11 with an elongated linear shape which is secured to the second movable member 8b, a pinion 12 adapted to rotate by being engaged at its outer peripheral portion with a side surface of the rack 11, and a clutch 13 adapted to transmit only the rotational torque in a first rotational direction D4 out of the rotational torques of the pinion 12. Further, in the present embodiment, the drag member 10 is constituted by a helical spring, but the drag member 10 is not limited to this structure. For example, the drag member 10 can be also constituted by a rotary damper.

Figure 3:
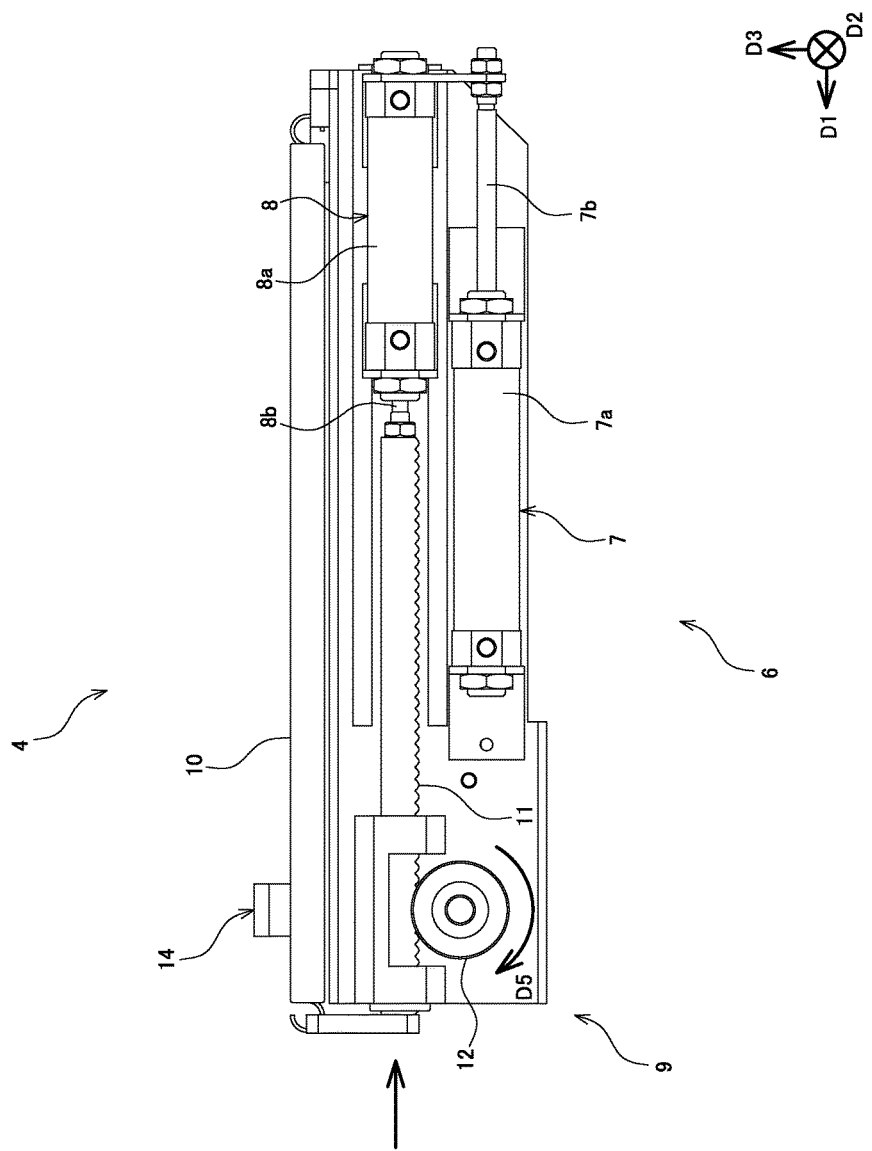
FIG. 3 is a side view of the valve device according to the same embodiment and a view illustrating a state before forward motion is started (a state where backward motion has been completed).

Hereinafter, operations of the driving device 6 will be described. At first, as illustrated in FIG. 3, when the first and second cylinders 7 and 8 have completed the previous reciprocating motion, a major portion of the first movable member 7b is placed outside the first main body 7a, while a major portion of the second movable body 8b is placed inside the second main body 8a.

Figure 4:
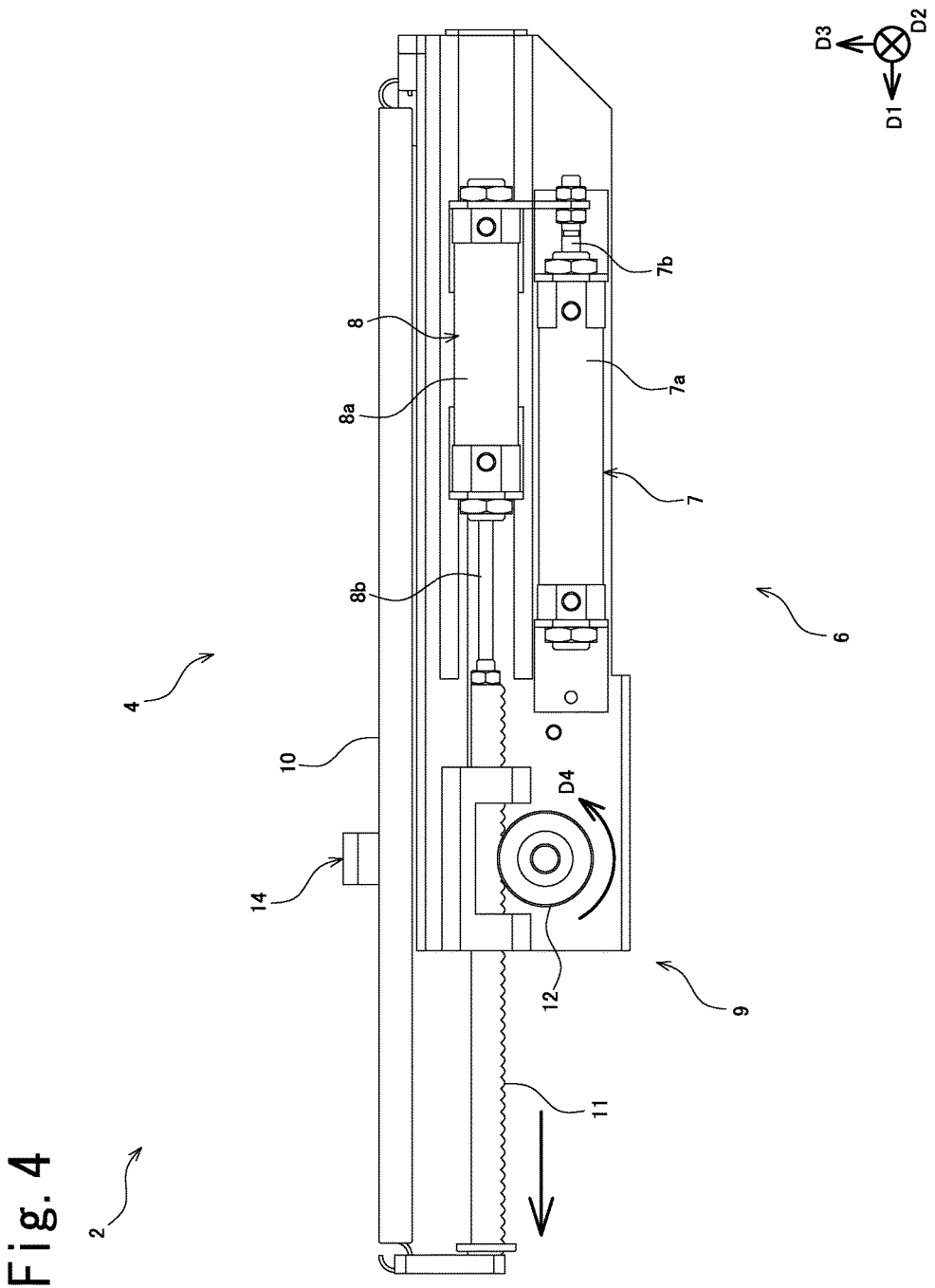
FIG. 4 is a side view of the valve device according to the same embodiment and a view illustrating a state where forward motion has been completed (a state before backward motion is started).

Further, the first and second main bodies 7a and 8a are both supplied with the pressurized medium, so that the first movable member 7b moves to enter the inside of the first main body 7a, while the second movable member 8b moves to exit from the second main body 8a to the outside, as illustrated in FIG. 4. At this time, the second cylinder 8 moves with respect to the first cylinder 7. Thus, the second movable body 8b performs linear reciprocating motion with respect to the first main body 7a (moves in the direction of an arrow in a first direction D1 (in the leftward direction in FIGS. 3 and 4)).

Along therewith, the rack 11 performs linear motion together with the second movable body 8b, and the pinion 12 performs rotational motion in a first rotational direction D4 by engaging with the rack 11. Further, the clutch 13 transmits the rotational torque of the pinion 12 in the first rotational direction D4 to the control cams 5, so that the control cams 5 rotate in the first rotational direction D4.

On the other hand, the control cams 5 have outer peripheral portions with concave and convex shapes and, further, the plural control cams 5 have outer peripheral portions with respective different concave and convex shapes. Therefore, the rotational torque required for integrally rotating the plural control cams 5 changes with their rotational positions. Further, the change of this rotational torque is transmitted to the second movable member 8b through the conversion transmission portion 9 to form a drag force against the second movable member 8b. Thus, even though the first and second cylinders 7 and 8 are continuously supplied with the same amount of the pressurized medium, the speed of the movement of the second movable member 8b is changed.

For coping therewith, the drag member 10 elastically deforms in such a way as to stretch, so that the drag member 10 applies a drag force to the second movable member 8b, when the second movable member 8b performs forward motion. Further, this drag force is set to be larger than this rotational torque. For example, this drag force is equal to or more than twice this rotational torque and, preferably, is equal to or more than five times this rotational torque and, more preferably, is equal to or more than ten times this rotational torque.

Thus, the change of this rotational torque is smaller than this drag force, so that the drag force against the second movable member 8b is made substantially constant. Accordingly, the speed of the movement of the second movable member 8b is made substantially constant, since the first and second cylinders 7 and 8 are continuously supplied with the same amount of the pressurized medium. As a result thereof, the speed of the movement of the rack 11, the speed of the rotation of the pinion 12, and the speed of the rotations of the control cams 5 are made substantially constant.

Thereafter, the pressurized medium is discharged from both the first and second main bodies 7a and 8a, so that the first movable member 7b moves to exit from the first main body 7a to the outside while the second movable member 8b moves to enter the inside of the second main body 8a, as illustrated in FIG. 3, since the drag member 10 applies a drag force to the second movable member 8b. Thus, the second movable member 8b performs linear backward motion with respect to the first main body 7a (moves in the opposite direction from the direction of the arrow in the first direction D1 (in the rightward direction in FIGS. 3 and 4)).

Along therewith, the rack 11 performs linear motion together with the second movable body 8b, and the pinion 12 performs rotational motion in the second rotational direction D5 by engaging with the rack 11. However, the clutch 13 does not transmit the rotational torque of the pinion 12 in the second rotational direction D5 to the control cams 5. Thus, the control cams 5 do not rotate.

As described above, since the first and second main bodies 7a and 8b are supplied with the pressurized medium, the second movable member 8b performs reciprocating motion with respect to the first main body 7a. Further, the conversion transmission portion 9 converts the forward motion of the second movable member 8b into rotational motion in the first rotational direction D4 and transmits this rotational motion to the control cams 5, while the conversion transmission portion 9 does not transmit the backward motion of the second movable member 8b to the control cams 5.

Figure 5:
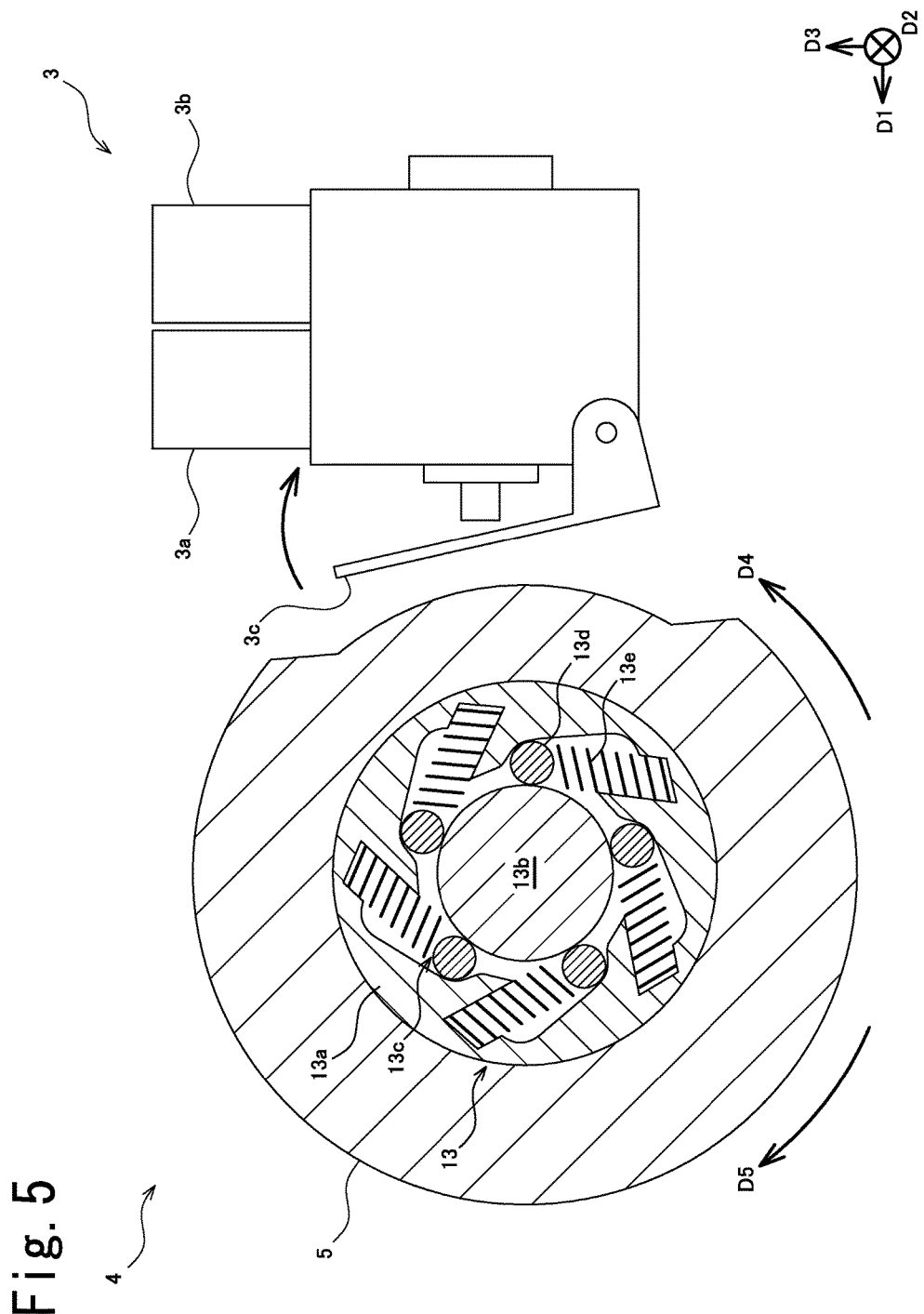
FIG. 5 is a view of main portions of a control device according to the same embodiment and is a view partially illustrating a cross section.

Hereinafter, the configuration of the clutch 13 will be described. As illustrated in FIG. 5, the clutch 13 includes a first rolling member (which will be also referred to as "an outer rolling member", hereinafter) 13a with an annular shape, a second rolling member (which will be also referred to as "an inner rolling member", hereinafter) 13b placed within the outer rolling member 13a, and a clutch portion 13c adapted to transmit the rotational torque between the outer rolling member 13a and the inner rolling member 13b and to interrupt this transmission. In the present embodiment, the clutch 13 is formed to be a one-way clutch.

The outer rolling member 13a is secured to the plural control cams 5 and is adapted to rotate integrally with the plural control cams 5 about the same axis thereas. Further, the inner rolling member 13b is formed to have a shaft shape, further is secured to the pinion 12 at an end portion thereof and is adapted to rotate integrally with the pinion 12 about the same axis thereas. Further, in the present embodiment, the clutch portion 13c is of a cam type having clutch rollers (steel balls) 13d and springs 13e, but the clutch portion 13c can be also of a spray type.

Further, when the rotational speed of the inner rolling member 13b in the first rotational direction D4 is larger than the corresponding speed of the outer rolling member 13a, the clutch portion 13c transmits the rotational torque between the outer rolling member 13a and the inner rolling member 13b. Further, when the rotational speed of the outer rolling member 13a in the second rotational direction D5 is larger than the corresponding speed of the inner rolling member 13b, the clutch portion 13c transmits the rotational torque between the outer rolling member 13a and the inner rolling member 13b.

On the contrary, when the rotational speed of the inner rolling member 13b in the second rotational direction D5 is larger than the corresponding speed of the outer rolling member 13a, the clutch portion 13c interrupts the transmission of the rotational torque between the outer rolling member 13a and the inner rolling member 13b. Further, when the rotational speed of the outer rolling member 13a in the first rotational direction D4 is larger than the corresponding speed of the inner rolling member 13b, the clutch portion 13c interrupts the rotational torque between the outer rolling member 13a and the inner rolling member 13b.

Therefore, when the second movable member 8b and the rack 11 perform forward motion, the pinion 12 and the inner rolling member 13b rotate in the first rotational direction D4. Thus, the rotational speed of the inner rolling member 13b in the first rotational direction D4 is larger than the corresponding speed of the outer rolling member 13a which is being stopped, so that the rotational torque of the inner rolling member 13b is transmitted to the outer rolling member 13a through the clutch portion 13c. As a result thereof, the outer rolling member 13a rotates in the first rotational direction D4, so that the control cams 5 rotate in the first rotational direction D4 integrally with the outer rolling member 13d.

On the contrary, when the second movable member 8b and the rack 11 perform backward motion, the pinion 12 and the inner rolling member 13b rotate in the second rotational direction D5. Thus, the rotational speed of the inner rolling member 13b in the second rotational direction D5 is larger than the corresponding speed of the outer rolling member 13a which is being stopped, so that the rotational torque of the inner rolling member 13b is not transmitted to the outer rolling member 13a through the clutch portion 13c. As a result thereof, the outer rolling member 13a and the control cams 5 are not rotated.

As described above, when the second movable member 8b and the rack 11 perform forward motion, and the pinion 12 rotates in the first rotational direction D4, the clutch 13 transmits the rotational torque in the first rotational direction D4 to the control cams 5. On the other hand, when the second movable member 8b and the rack 11 perform backward motion, and the pinion 12 rotates in the second rotational direction D5, the clutch 13 does not transmit the rotational torque in the second rotational direction D5 to the control cams 5.

On the other hand, the conversion transmission portion 9 includes the rack 11, the pinion 12, and the clutch 13 adapted to transmit, to the control cams 5, only the rotational torque in the first rotational direction D4, out of the rotational torques of the pinion 12. Accordingly, only the forward motion of the rack 11 is converted into rotational motion, and this rotational motion is transmitted to the control cams 5. Therefore, if the control cams 5 have not performed an accurate single rotation as a result of forward motion of the rack 11, this causes gradual positional deviations of the positions at which the control cams 5 start rotating.

Figure 6:
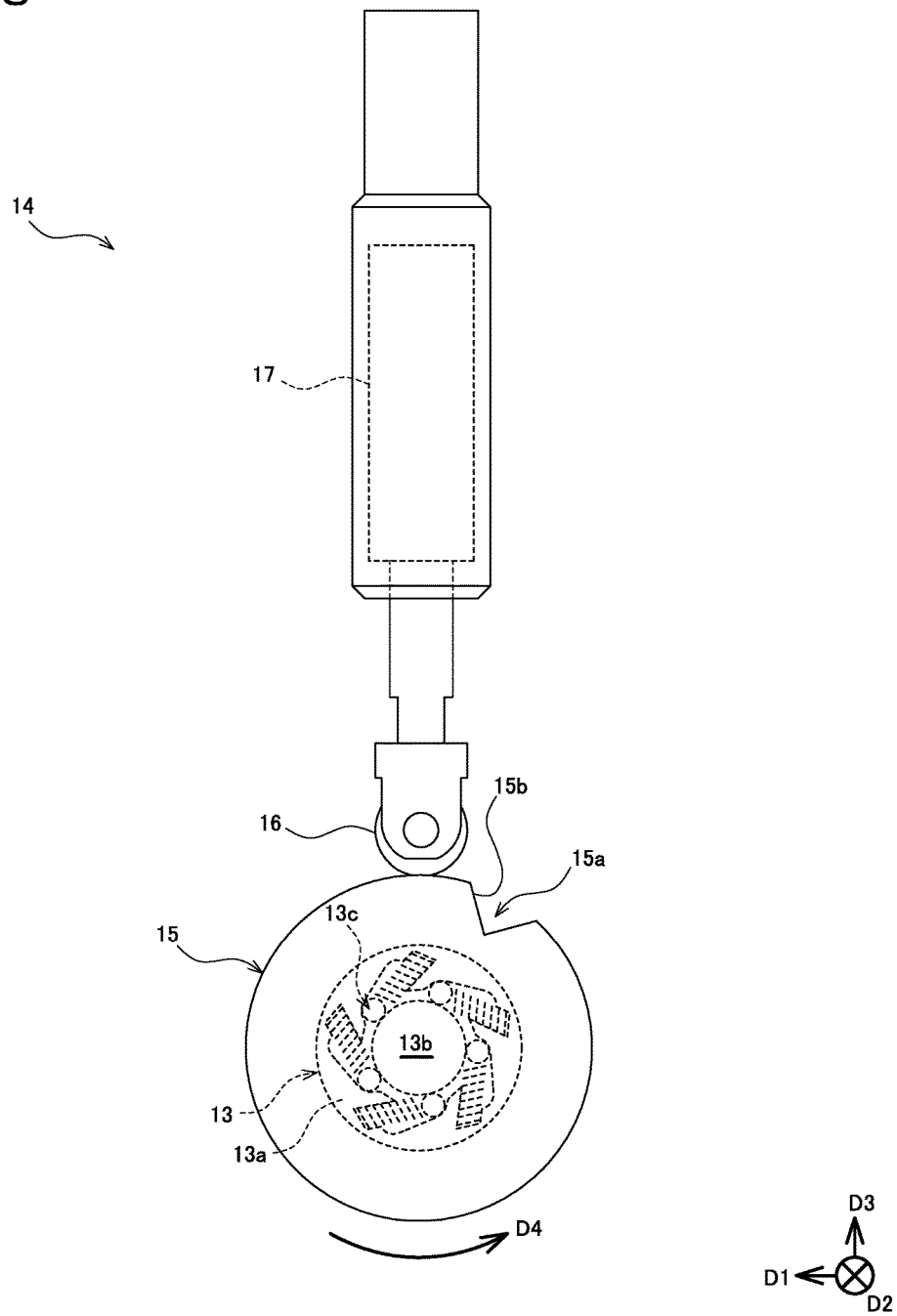
FIG. 6 is a view of the general outline of a positional adjustment portion according to the same embodiment.

For coping therewith, as illustrated in FIG. 6, the driving device 6 includes a positional adjustment portion 14 adapted to position the control cams 5 at original positions (positions at which the control cams 5 should be positioned at the start of rotations of the control cams 5), when the second movable member 8b has completed a single reciprocating motion. The positional adjustment portion 14 includes a rotary member 15 which is rotatable, and a lock member 16 adapted to slide on the outer peripheral portion of the rotary member 15 and to lock the rotary member 15 when the control cams 5 are positioned at the original positions.

The rotary member 15 is secured to the outer rolling member 13a and is adapted to rotate integrally with the outer rolling member 13a about the same axis thereas. Accordingly, the rotary member 15 rotates integrally with the control cams 5 about the same axis thereas. Further, the positional adjustment portion 14 includes a pressurizing member 17 adapted to bring the lock member 16 into press contact with the rotary member 15 radially inwardly. In the present embodiment, the pressurizing member 17 is constituted by a helical spring.

Further, the amount of the rotation of the pinion 12 in the first rotational direction D4 which is caused by a single forward motion of the second movable member 8b and the rack 11 is set to be equal to or less than a single rotation (less than a single rotation in the present embodiment). Therefore, the rotary member 15 includes a lock portion 15a with a concave shape which is locked by the lock member 16 when the control cams 5 are positioned at the original positions. Further, the rotary member 15 includes a guide portion 15b for guiding the lock member 16 toward the lock portion 15a.

The guide portion 15b is continuously connected to the lock portion 15a in the first rotational direction D4. More specifically, the guide portion 15b is placed at least from the position at which the lock member 16 is positioned as a result of a single forward motion of the second movable member 8b and the rack 11, up to the lock portion 15a. Further, the guide portion 15b is gradually deepened toward the lock portion 15a.

Figure 7:
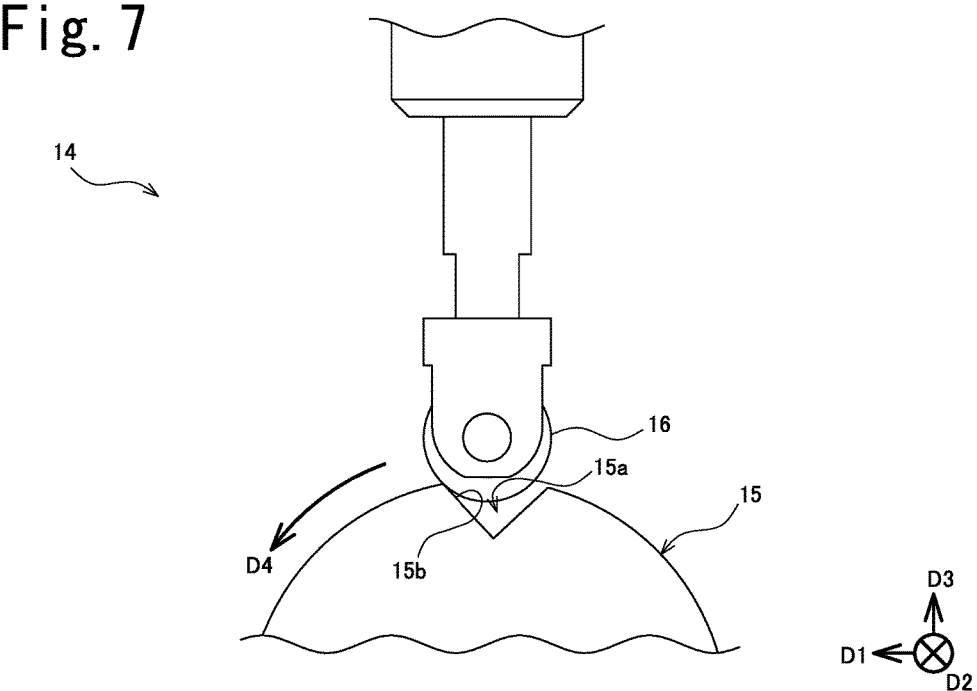
FIG. 7 is a view of main portions of the positional adjustment portion according to the same embodiment and is a view illustrating positional adjustment.

Hereinafter, the positional adjustment portion 14 will be described with respect to effects thereof. At first, after the second movable member 8b and the rack 11 have performed forward motion, the lock member 16 is positioned in the guide portion 15b in the rotary member 15, as illustrated in FIG. 7. At this time, even if the second movable member 8b and the rack 11 start backward motion, and the inner rolling member 13b rotates in the second rotational direction D5, the outer rolling member 13a is not rotated and, therefore, the rotary member 15 is also not rotated in the second rotational direction D5.

On the other hand, the lock member 16 is in press contact with the guide portion 15b which is gradually deepened toward the lock portion 15a. Thus, the rotary member 15 is subjected to a rotational torque in the first rotational direction D4, from the lock member 16 and the pressurizing member 17. At this time, the inner rolling member 13b is rotating in the second rotational direction D5 or being stopped and, therefore, the speed of the rotary member 15 and the outer rolling member 13a in the first rotational direction D4 is larger than the corresponding speed of the inner rolling member 13b.

Figure 8:
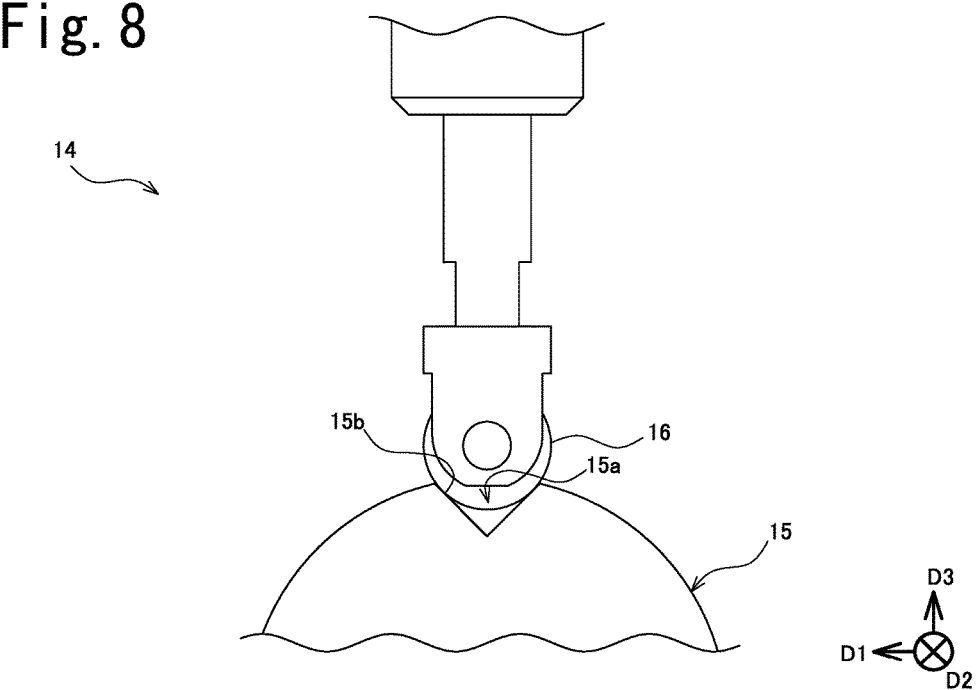
FIG. 8 is a view of main portions of the positional adjustment portion according to the same embodiment and is a view illustrating positional adjustment.

Thus, the clutch portion 13c interrupts the transmission of the rotational torque between the outer rolling member 13a and the inner rolling member 13b, so that the outer rolling member 13a and the rotary member 15 rotate in the first rotational direction D4 without being locked by the inner rolling member 13b. Further, as illustrated in FIG. 8, the lock portion 15a in the rotary member 15 is locked by the lock member 16, so that the control cams 5 are positioned at the original positions. Thus, the positions at which the control cams 5 start rotating are kept at the original positions, any time.

As described above, with the sealing device 1 and the valve device 2 according to the present embodiment, it is possible to control the plural valves 3, without supplying electricity to the valves 3 and the control device 4. Accordingly, the sealing device 1 and the valve device 2 can be also used as a sealing device 1 and a valve device 2 having a complete explosion-proof specification which necessitates no electricity.

As described above, the sealing device 1 of the embodiment includes: a pair of sealing portions 1a and 1b adapted to get closer to each other and to get away from each other for sandwiching an object for sealing the object; and the valve device 2; wherein the valve device 2 is adapted to control an operation of at least one of the pair of the sealing portions 1a and 1b (one sealing portion 1a in the embodiment).

Further, in the valve device 2 of the embodiment, the valve device 2 includes: at least one valve 3 having a switch portion 3c and adapted to be opened and closed by the switch portion 3c being operated; and a control device 4 adapted to control the valve 3 without being supplied with electricity; the control device 4 includes at least one rotatable control cam 5 having an outer periphery with a concave and convex shape, and a driving device 6 adapted to rotate the control cam 5 only in a first rotational direction D4, out of the first rotational direction D4 and a second rotational direction D5 opposite from the first rotational direction D4, by being supplied with a pressurized medium, and the valve 3 is placed such that the switch portion 3c comes in contact with the outer peripheral portion of the control cam 5, in order that the valve 3 is opened and closed by the control cam 5 being rotated.

With this structure, the control cams 5 have outer peripheries with concave-and-convex shapes and, also, are rotatable. Further, since the driving device 6 is supplied with the pressurized medium, the driving device 6 causes the control cams 5 to rotate only in the first rotational direction D4, without being supplied with electricity. Further, the switch portions 3c of the valves 3 are in contact with the outer peripheral portions of the control cams 5 and, therefore, the valves 3 are opened and closed, when the switch portions 3c are operated along with rotations of the control cams 5. This enables controlling the valves 3, without being supplied with electricity.

Further, in the valve device 2 of the embodiment, the driving device 6 includes a movable member 8b adapted to perform reciprocating motion by being supplied with the pressurized medium, and a conversion transmission portion 9 adapted to convert the reciprocating motion of the movable member 8b into rotational motion and to transmit the rotational motion to the control cam 5.

With this structure, the movable member 8b performs reciprocating motion, by being supplied with the pressurized medium. Further, the conversion transmission portion 9 converts the reciprocating motion of the movable member 8b into rotational motion and transmits the rotational motion to the control cams 5. Thus, it is possible to ensure stability of repetitive controls (capability of performing the same control every time), by making a single reciprocating motion of the movable member 8b corresponding to a single rotation of the control cams 5, for example.

Further, in the valve device 2 of the embodiment, the conversion transmission portion 9 includes a rack 11 secured to the movable member 8b, a pinion 12 adapted to rotate by engaging with the rack 11, and a clutch 13 adapted to transmit, to the control cam 5, only a rotational torque in the first rotational D4 torque, out of rotational torques of the pinion 12.

With this structure, the pinion 12 rotates by engaging with the rack 11 secured to the movable member 8b. Further, the clutch 13 transmits, to the control cams 5, only the rotational torque in the first rotational direction D4, out of the rotational torques of the pinion 12. This enables performing proper control, since the control cams 5 are rotated only in the first rotational direction D4.

Further, for example, when the movable member 8b performs linear motion at a constant speed only in a single direction, the control cams 5 can perform rotational motion at a constant speed in the first rotational direction D4. This enables easily realizing rotational motion of the control cams 5 at a constant speed, which enables performing control more properly.

Further, in the valve device 2 of the embodiment, the pinion 12 is adapted to rotate in the first rotational direction D4 when the movable member 8b performs forward motion, and the driving device 6 includes a drag member 10 adapted to apply a drag force to the movable member 8b, when the movable member 8b performs the forward motion. Further, the drag force applied to the movable member 8b by the drag member 10 is preferably larger than the rotational torque transmitted to the control cam 5 through the clutch 13.

With this structure, when the movable member 8b performs forward motion, the pinion 12 rotates in the first rotational direction D4, which causes the control cams 5 to rotate in the first rotational direction D4. At this time, due to the shapes of the outer peripheral portions of the control cams 5, the switch portions 3c in the valves 3 come into contact with the outer peripheral portions of the control cams 5 at varying positions, which changes the rotational torque required for rotating the control cams 5. This may change the rotating speed of the control cams 5.

For coping therewith, the drag member 10 applies a drag force to the movable member 8b, when the movable member 8b performs forward motion. Further, as this drag force is made larger than the change of the rotational torque required for rotating the control cams 5, the change of the rotating speed of the control cams 5 due to the change of this rotational torque is made smaller. This enables rotational motion of the control cams 5 at a substantially constant speed, which enables performing proper control.

Further, in the valve device 2 of the embodiment, the driving device 6 includes a positional adjustment portion 14 adapted to position the control cam 5 at an original position when the movable member 8b has completed a single reciprocating motion, and the positional adjustment portion 14 includes a rotary member 15 adapted to rotate integrally with the control cam 5, and a lock member 16 adapted to lock the rotary member 15 when the control cam 5 is positioned at the original position.

With this structure, when the movable member 8b has completed a single reciprocating motion, the positional adjustment portion 14 positions the control cams 5 at the original positions. Further, when the control cams 5 are positioned at the original positions, the lock member 16 locks the rotary member 15 which is adapted to rotate integrally with the control cams 5. This causes the control cams 5 to start controlling (rotating) from the original positions any time, which can ensure stability of repetitive controls.

Further, in the valve device 2 of the embodiment, the lock member 16 slides on an outer peripheral portion of the rotary member 15, the positional adjustment portion 14 includes a pressurizing member 17 adapted to bring the lock member 16 into press contact with the rotary member 15, the rotary member 15 includes a lock portion 15a with a concave shape which is locked by the lock member 16, when the control cam 5 is positioned at the original position, an amount of rotation of the pinion 12 in the first rotational direction D4 which is caused by a single forward motion of the movable member 8b is equal to or less than a single rotation, the rotary member 15 includes a guide portion 15b adapted to guide the lock member 16 up to the lock portion 15a from a position at which the lock member 16 is positioned as a result of a single forward motion of the movable member 8b, and the guide portion 15b is gradually deepened toward the lock portion 15a, in order that the rotary member 15 rotates in the first rotational direction D4 by being in press contact with the lock member 16.

With this structure, the lock member 16 slides on the outer peripheral portion of the rotary member 15, while being kept in press contact with the outer peripheral portion of the rotary member 15 by the pressurizing member 17. Further, when the control cams 5 are positioned at the original positions, the lock member 16 locks the lock portion 15a with the concave portion in the rotary member 15. On the other hand, the amount of the rotation of the pinion 12 in the first rotational direction D4 which is caused by a single forward motion of the movable member 8b is set to be equal to or less than a single rotation. This prevents the control cams 5 to exceed the original positions, as a result of a single reciprocating motion of the movable member 8b.

Further, the guide portion 15b is gradually deepened toward the lock portion 15a, from the position at which the lock member 16 is positioned as a result of a single forward motion of the movable member 8b, up to the lock portion 15a. Thus, the rotary member 15 rotates in the first rotational direction D4, since the lock member 16 is in press contact with the guide portion 15b. Further, the lock member 16 locks the lock portion 15a by being guided up to the lock portion 15a through the guide portion 15b, which causes the control cams 5 to be positioned at the original positions.

Further, in the valve device 2 of the embodiment, the control cam 5 is placed such that the control cam 5 comes into contact with the switch portion 3c and separates from the switch portion 3c, by being rotated. Further, in the valve device 2 of the embodiment, a plurality of the valves 3 and a plurality of the control cams 5 are provided, and the driving device 6 includes a rolling member 13a secured to the plurality of the control cams 5, such that the rolling member 13a rotates integrally with the plurality of the control cams 5 about the same axis.

The sealing device 1 and the valve device 2 is not limited to the configuration of the embodiment described above, and the effects are not limited to those described above. It goes without saying that the sealing device 1 and the valve device 2 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

In the valve device 2 according to the aforementioned embodiment, the driving device 6 is adapted to include the movable member 8b adapted to perform reciprocating motion, and the conversion transmission portion 9 adapted to convert the reciprocating motion of the movable member 8b into rotational motion and to transmit the rotational motion to the control cams 5. Namely, the driving device 6 is adapted to include the driving sources (cylinders) 7 and 8 having the movable member 8b adapted to perform reciprocating motion. However, the valve device 2 is not limited to this structure. For example, as illustrated in FIGS. 9 and 10, the driving device 6 can be also adapted to include a driving source 18 adapted to perform rotational motion.

Figure 9:
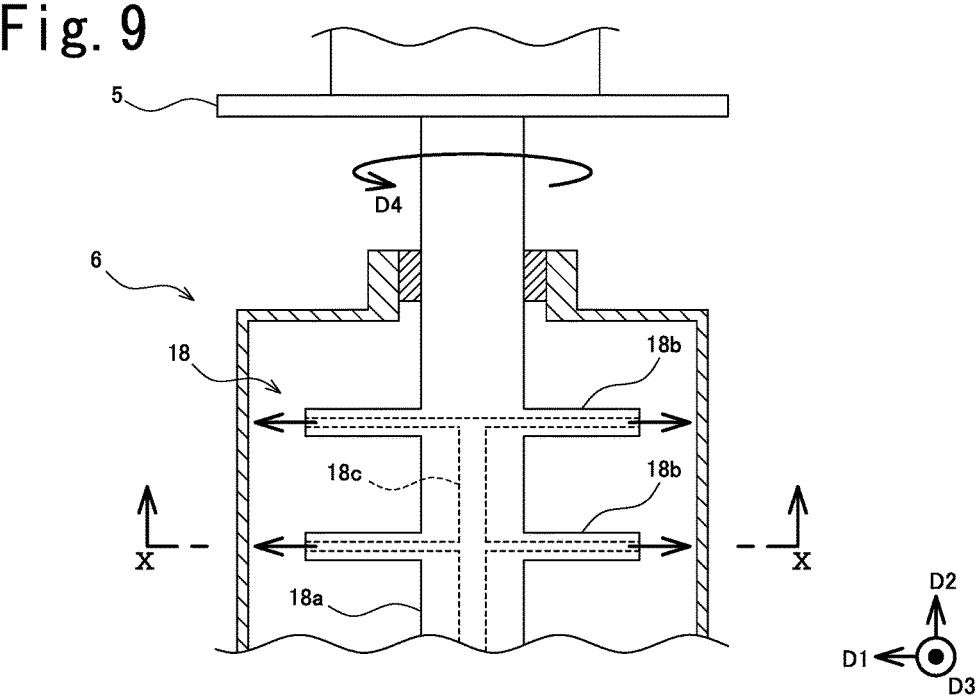
FIG. 9 is a view of main portions of a control device according to another embodiment and is a view partially illustrating a cross section.
Figure 10:
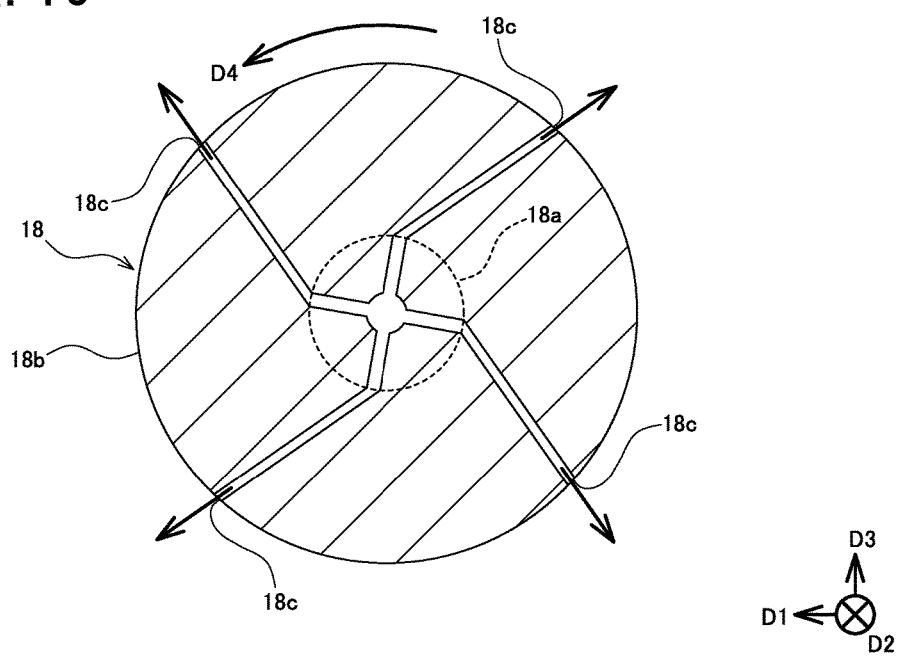
FIG. 10 is a cross-sectional view taken along a line X-X in FIG. 9

The driving source 18 in FIGS. 9 and 10 includes a shaft member 18a adapted to rotate integrally with the control cams 5 (the inner rolling member 13b) about the same axis thereas, plate members 18b adapted to rotate integrally with the shaft member 18a about the same axis thereas, and flow portions 18c adapted to flow a pressurized medium (for example, an oil, water, or a compressed air) within the shaft member 18a and the plate members 18b. Further, the flow portions 18c in the plate members 18b are extended in such a way as to intersect with each other in the radial direction.

Thus, the pressurized medium is flowed within the flow portions 18c and is vigorously ejected from the plate members 18b, which induces a rotational torque in the first rotational direction D4 in the plate members 18b. This enables the driving device 6 to rotate the control cams 5 in the first rotational direction D4, since the driving source 18 is supplied with the pressurized medium.

Further, in the valve device 2 according to the aforementioned embodiment, the conversion transmission portion 9 is adapted to include the rack 11 secured to the movable member 8b, and the pinion 12 adapted to rotate by engaging with the rack 11. However, the valve device 2 is not limited to this structure. For example, as illustrated in FIGS. 11 and 12, the conversion transmission portion 9 can be also adapted to include a disk member 19 adapted to rotate integrally with the control cams 5 (the inner rolling member 13b) about the same axis thereas, and a link 20 adapted to couple the disk member 19 and a movable member 7b to each other.

The conversion transmission portion 9 in FIGS. 11 and 12 includes a biasing member 21 adapted to bias the disk member 19 in the first rotational direction D4, when the link 20 is positioned at dead points. Further, in FIGS. 11 and 12, the biasing member 21 is constituted by a helical spring. Further, the driving device 6 in FIGS. 11 and 12 also includes a single cylinder 7 having a main body 7a and the movable member 7b.

Further, as illustrated in FIG. 11, when the link 20 is positioned at a first dead point, the biasing member 21 has been elastically deformed to be shrunk and, therefore, generates an elastic restoring force in such a way as to stretch. Thus, the biasing member 21 biases the disk member 19 in the first rotational direction D4.

Further, as illustrated in FIG. 12, when the link 20 is positioned at a second dead point, the biasing member 21 has been elastically deformed to be stretched and, therefore, generates an elastic restoring force in such a way as to shrink. Thus, the biasing member 21 biases the disk member 19 in the first rotational direction D4.

Further, with the conversion transmission portion 9 in FIGS. 11 and 12, for example, when the movable member 7b performs linear reciprocating motion at a constant speed, the disk member 19, namely the control cams 5, is not caused to perform rotational motion at a constant speed. Accordingly, in order to cause the control cams 5 to perform rotational motion at a constant speed, it is necessary to change the speed of the linear reciprocating motion of the movable member 7b.

Further, in the valve device 2 according to the aforementioned embodiment, the positional adjustment portion 14 includes the guide portion 15b which is continuously connected to the lock portion 15a, and the amount of the rotation of the pinion 12 in the first rotational direction D4 which is caused by a single forward motion of the movable member 8b is equal to or less than a single rotation. However, the valve device 2 is not limited to this structure. For example, as illustrated in FIGS. 13 and 14, the amount of the rotation of the pinion 12 in the first rotational direction D4 which is caused by a single forward motion of the movable member 8b can be also equal to or more than a single rotation.

Figure 13:
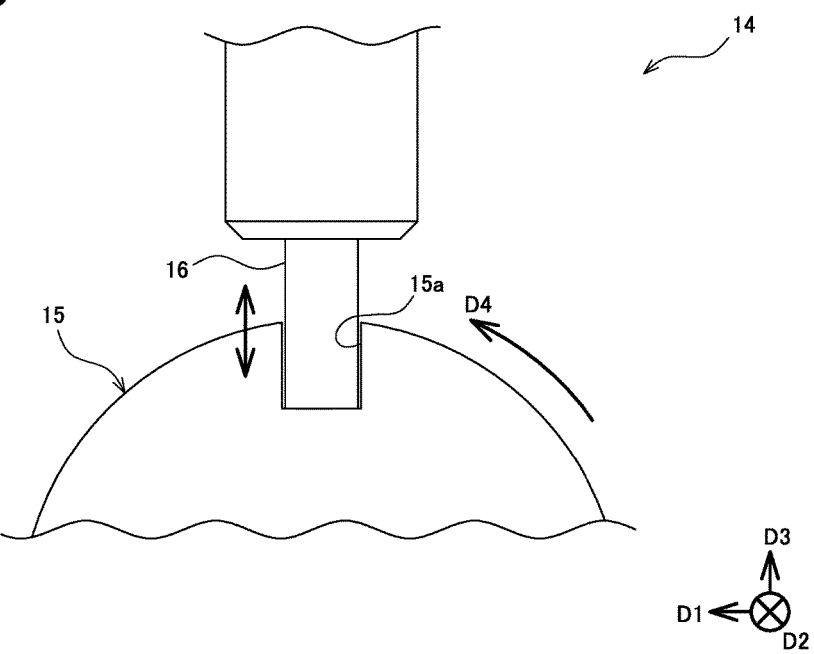
FIG. 13 is a view of the general outline of main portions of a positional adjustment portion according to yet another embodiment.
Figure 14:
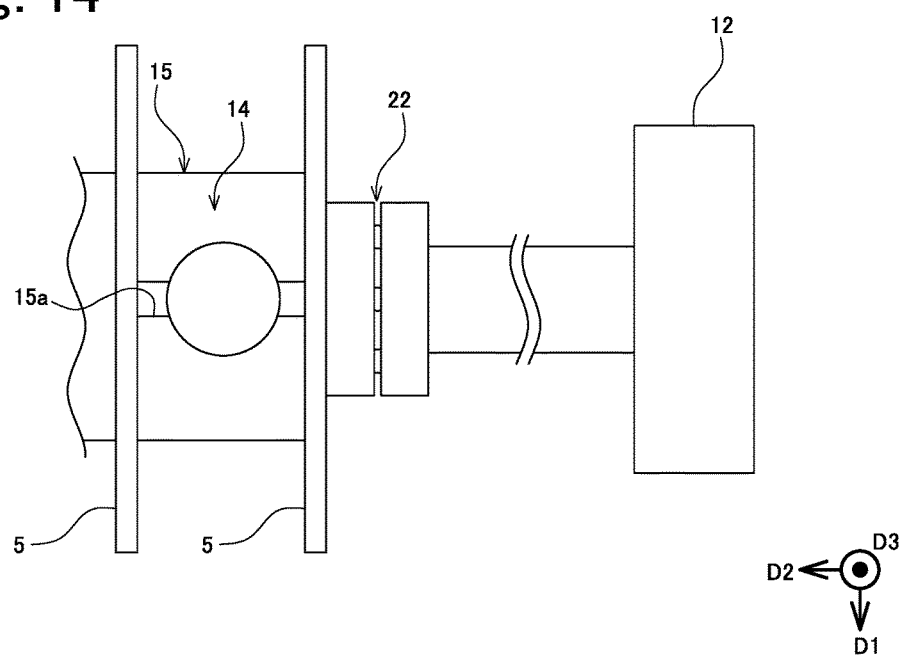
FIG. 14 is a view of the general outline of main portions of the positional adjustment portion according to the same embodiment.

A lock member 16 in FIGS. 13 and 14 can be moved in the upward and downward directions with respect to a rotary member 15, by being supplied with a pressurized medium, for example. Further, a positional adjustment portion 14 in FIGS. 13 and 14 includes a connection portion 22 adapted to interrupt the connection if it is subjected to a predetermined or greater torque, between a pinion 12 and control cams 5. The connection portion 22 can be also referred to as a torque limiter or a safety clutch, for example.

Hereinafter, the positional adjustment portion 14 in FIGS. 13 and 14 will be described, with respect to effects thereof. At first, the lock member 16 locks a lock portion 15a with a concave shape in the rotary member 15, when the control cams 5 are positioned at the original positions. Further, when the control cams 5 start rotating, the lock member 16 is ascended to be pulled out from the lock portion 15a in the rotary member 15. Thereafter, if the rotary member 15 is rotated by a predetermined amount in the first rotational direction D4, the lock member 16 is descended and, further, is slid on the outer peripheral portion of the rotary member 15 while being in press contact with the outer peripheral portion of the rotary member 15 radially inwardly.

Further, if the amount of the rotation of the pinion 12 and the control cams 5 in the first rotational direction D4 reaches a single rotation, the lock portion 16 enters the lock portion 15a in the rotary member 15 to lock the rotary member 15. Thereafter, if the pinion 12 tries to rotate in the first rotational direction D4, the connection portion 22 interrupts the connection, which prevents the rotary member 15 and the control cams 5 from rotating, while allowing the pinion 12 to rotate in the first rotational direction D4. Thus, after the movable member 8b has completed a single reciprocating motion, the control cams 5 are positioned at the original positions.

Further, in the valve device 2 according to the aforementioned embodiment, the clutch 13 is adapted to be the one-way clutch having the outer rolling member 13a and the inner rolling member 13b. However, the valve device 2 is not limited to this structure. For example, the clutch 13 can be also adapted to be a gear clutch adapted to change over between a state where gears engage with each other and a state where the gears are separated from each other. Further, the clutch 13 can be also adapted to be a freewheel having a ratchet mechanism.

Further, the valve device 2 according to the aforementioned embodiment is adapted to be used in the sealing device 1. However, the valve device 2 is not limited to this structure. For example, the valve device 2 can be also adapted to be used in packaging devices or other devices which are controlled with valves 3.

REFERENCE SIGNS LIST

1 Sealing device
1a First sealing portion
1b Second sealing portion
1c Operating portion
1d Casing
1e Steam supply portion
1f Air supply portion
1g Exhaust portion
1h Timer
1i Thermometer
2 Valve device
3 Valve
3a Inlet portion
3b Outlet portion
3c Switch portion
4 Control device
5 Control cam
6 Driving device
7 First cylinder
7a First main body
7b First movable member
8 Second cylinder
8a Second main body
8b Second movable member
9 Conversion transmission portion
10 Drag member
11 Rack
12 Pinion
13 Clutch
13a Outer rolling member
13b Inner rolling member
13c Clutch portion
13d Clutch roller
13e Spring
14 Positional adjustment portion
15 Rotary member
15a Lock portion
15b Guide portion
16 Lock member
17 Pressurizing member
18 Driving source
18a Shaft member
18b Plate member
18c Flow portion
19 Disk member
20 Link
21 Biasing member
22 Connection portion
D4 First rotational direction
D5 Second rotational direction

What is claimed is:

1. A valve device comprising:
at least one valve having a switch portion, the switch portion is operated to open and close the at least one valve without electricity; and
a control device configured to control the at least one valve without being supplied with electricity;
wherein
the control device includes at least one rotatable control cam having an outer periphery with a concave and convex shape, and a driving device configured to rotate the at least one rotatable control cam in a first rotational direction and to prevent the at least one rotatable control cam from rotating in a second rotational direction opposite from the first rotational direction, by being supplied with a pressurized medium, and
the at least one valve is placed such that the switch portion comes in contact with the outer peripheral portion of the at least one rotatable control cam, in order that the at least one valve is opened and closed by the at least one rotatable control cam being rotated.

2. The valve device according to claim 1, wherein the at least one rotatable control cam is placed such that the at least one rotatable control cam comes into contact with the switch portion and separates from the switch portion, by being rotated.

3. The valve device according to claim 1, wherein
a plurality of the at least one valves and a plurality of the at least one rotatable control cams are provided, and
the driving device includes a rolling member secured to the plurality of the at least one rotatable control cams, such that the rolling member rotates integrally with the plurality of the at least one rotatable control cams about the same axis.

4. The valve device according to claim 1, wherein
the driving device includes a movable member configured to perform reciprocating motion by being supplied with the pressurized medium, and
a conversion transmission portion configured to convert the reciprocating motion of the movable member into rotational motion and to transmit the rotational motion to the at least one rotatable control cam.

5. The valve device according to claim 4, wherein
the conversion transmission portion includes a rack secured to the movable member, a pinion configured to rotate by engaging with the rack, and a clutch configured to transmit, to the at least one rotatable control cam, only a rotational torque in the first rotational torque, out of rotational torques of the pinion.

6. The valve device according to claim 5, wherein
the pinion is configured to rotate in the first rotational direction when the movable member performs forward motion, and
the driving device includes a drag member configured to apply a drag force to the movable member, when the movable member performs the forward motion.

7. The valve device according to claim 5, wherein
the driving device includes a positional adjustment portion configured to position the at least one rotatable control cam at an original position when the movable member has completed a single reciprocating motion, and
the positional adjustment portion includes a rotary member configured to rotate integrally with the at least one rotatable control cam, and a lock member configured to lock the rotary member when the at least one rotatable control cam is positioned at the original position.

8. The valve device according to claim 5, wherein
the clutch includes an outer rolling member with an annular shape to which the at least one rotatable control cam is fixed, an inner rolling member placed within the outer rolling member and configured to rotate by being supplied with a pressurized medium, and a clutch portion configured to transmit rotational torque between the outer rolling member and the inner rolling member.

9. The valve device according to claim 8, wherein
the clutch portion is configured to transmit rotational torque of the inner rolling member rotating in the first rotational direction to the outer rolling member and to interrupt rotational torque of the inner rolling member rotating in the second rotational direction from being transmitted to the outer rolling member.

10. A sealing device comprising:
a pair of sealing portions configured to get closer to each other and to get away from each other for sandwiching an object for sealing the object; and
the valve device according to claim 1;
wherein the valve device is configured to control an operation of at least one of the pair of the sealing portions.

11. The valve device according to claim 1, wherein
the driving device comprises a clutch configured to rotate the at least one rotatable control cam in the first rotational direction and to prevent t the at least one rotatable control cam from rotating in the second rotational direction opposite from the first rotational direction.

12. The valve device according to claim 11, wherein
the clutch includes an outer rolling member with an annular shape to which the at least one rotatable control cam is fixed, an inner rolling member placed within the outer rolling member and configured to rotate by being supplied with a pressurized medium, and a clutch portion configured to transmit rotational torque between the outer rolling member and the inner rolling member.

13. The valve device according to claim 12, wherein
the clutch portion is configured to transmit rotational torque of the inner rolling member rotating in the first rotational direction to the outer rolling member and to interrupt rotational torque of the inner rolling member rotating in the second rotational direction from being transmitted to the outer rolling member.

14. A valve device comprising:
at least one valve having a switch portion, the switch portion is operated to open and close the at least one valve without electricity; and
a control device configured to control the at least one valve without being supplied with electricity;
wherein
the control device includes at least one rotatable control cam having an outer periphery with a concave and convex shape, and a driving device configured to rotate the at least one rotatable control cam in a first rotational direction and to prevent the at least one rotatable control cam from rotating in a second rotational direction opposite from the first rotational direction, by being supplied with a pressurized medium,
the at least one valve is placed such that the switch portion comes in contact with the outer peripheral portion of the at least one rotatable control cam, in order that the at least one valve is opened and closed by the at least one rotatable control cam being rotated,
the driving device includes a movable member configured to perform reciprocating motion by being supplied with the pressurized medium,
a conversion transmission portion configured to convert the reciprocating motion of the movable member into rotational motion and to transmit the rotational motion to the at least one rotatable control cam,
the conversion transmission portion includes a rack secured to the movable member, a pinion configured to rotate by engaging with the rack, and a clutch configured to transmit, to the at least one rotatable control cam, only a rotational torque in the first rotational torque, out of rotational torques of the pinion,
the pinion is configured to rotate in the first rotational direction when the movable member performs forward motion,
the driving device includes a drag member configured to apply a drag force to the movable member, when the movable member performs the forward motion, and the drag force applied to the movable member by the drag member is larger than the rotational torque transmitted to the at least one rotatable control cam through the clutch.

15. A valve device comprising:
at least one valve having a switch portion, the switch portion is operated to open and close the at least one valve without electricity; and
a control device configured to control the at least one valve without being supplied with electricity;
wherein
the control device includes at least one rotatable control cam having an outer periphery with a concave and convex shape, and a driving device configured to rotate the at least one rotatable control cam in a first rotational direction and to prevent the at least one rotatable control cam from rotating in a second rotational direction opposite from the first rotational direction, by being supplied with a pressurized medium,
the at least one valve is placed such that the switch portion comes in contact with the outer peripheral portion of the at least one rotatable control cam, in order that the at least one valve is opened and closed by the at least one rotatable control cam being rotated,
the driving device includes a movable member configured to perform reciprocating motion by being supplied with the pressurized medium,
a conversion transmission portion configured to convert the reciprocating motion of the movable member into rotational motion and to transmit the rotational motion to the at least one rotatable control cam,
the conversion transmission portion includes a rack secured to the movable member, a pinion configured to rotate by engaging with the rack, and a clutch configured to transmit, to the at least one rotatable control cam, only a rotational torque in the first rotational torque, out of rotational torques of the pinion,
the driving device includes a positional adjustment portion configured to position the at least one rotatable control cam at an original position when the movable member has completed a single reciprocating motion,
the positional adjustment portion includes a rotary member configured to rotate integrally with the at least one rotatable control cam, and a lock member configured to lock the rotary member when the at least one rotatable control cam is positioned at the original position,
the lock member slides on an outer peripheral portion of the rotary member,
the positional adjustment portion includes a pressurizing member configured to bring the lock member into press contact with the rotary member,
the rotary member includes a lock portion with a concave shape which is locked by the lock member, when the at least one rotatable control cam is positioned at the original position,
an amount of rotation of the pinion in the first rotational direction which is caused by a single forward motion of the movable member is equal to or less than a single rotation,
the rotary member includes a guide portion configured to guide the lock member up to the lock portion from a position at which the lock member is positioned as a result of a single forward motion of the movable member, and
the guide portion is gradually deepened toward the lock portion, in order that the rotary member rotates in the first rotational direction by being in press contact with the lock member.

* * * * *